(12) United States Patent
Lyu et al.

(10) Patent No.: US 9,883,014 B2
(45) Date of Patent: Jan. 30, 2018

(54) SEPARATED COMMUNICATIONS DEVICE

(71) Applicant: Huawei Technologies Co., Ltd., Shenzhen (CN)

(72) Inventors: Shuwen Lyu, Shanghai (CN); Hongyu Wang, Shenzhen (CN); Xin Zhu, Shanghai (CN); Huimin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/520,380

(22) PCT Filed: Oct. 20, 2014

(86) PCT No.: PCT/CN2014/088885
§ 371 (c)(1),
(2) Date: Apr. 19, 2017

(87) PCT Pub. No.: WO2016/061722
PCT Pub. Date: Apr. 28, 2016

(65) Prior Publication Data
US 2017/0310797 A1    Oct. 26, 2017

(51) Int. Cl.
*H04B 1/38*    (2015.01)
*H04M 1/02*    (2006.01)

(52) U.S. Cl.
CPC ................. *H04M 1/0208* (2013.01)

(58) Field of Classification Search
CPC ....................... H04M 1/0208; H04B 1/40
See application file for complete search history.

(56) References Cited

U.S. PATENT DOCUMENTS

| | | | | |
|---|---|---|---|---|
| 2005/0057404 | A1* | 3/2005 | Demicco | H01Q 1/088 343/702 |
| 2006/0017626 | A1* | 1/2006 | Kannan | H01Q 1/088 343/702 |
| 2008/0081614 | A1* | 4/2008 | Lee | G06F 13/385 455/426.1 |
| 2009/0315789 | A1 | 12/2009 | Sung et al. | |

FOREIGN PATENT DOCUMENTS

| | | |
|---|---|---|
| EP | 1635421 A1 | 3/2006 |
| EP | 2221915 A1 | 8/2010 |
| EP | 2355242 A1 | 8/2011 |

* cited by examiner

*Primary Examiner* — Nguyen Vo
(74) *Attorney, Agent, or Firm* — Leydig, Voit & Mayer, Ltd.

(57) ABSTRACT

A separated communications device includes a body and a movable connector; the body includes an antenna and a first conductive strip, and the antenna is electrically connected to the first conductive strip; the movable connector includes a second conductive strip; when the movable connector is connected to the body, a part, covered by the movable connector due to the connection, on a surface of the body is a connection position of the body; and the antenna is disposed on the body near the connection position. When the body is connected to the movable connector, the second conductive strip is connected to the first conductive strip, so that the first conductive strip serves as a part of the antenna, and the second conductive strip serves as an extended part of the antenna.

8 Claims, 4 Drawing Sheets

SEPARATED COMMUNICATIONS DEVICE

CROSS-REFERENCE TO RELATED APPLICATIONS

This application is a National Stage of International Application No. PCT/CN2014/088885, filed on Oct. 20, 2014, which is hereby incorporated by reference in its entirety.

TECHNICAL FIELD

Embodiments of the present invention relate to the field of communications technologies, and in particular, to a separated communications device.

BACKGROUND

With rapid development of a smartphone, functions of the smartphone change quickly. Some detachable function modules, such as a detachable battery module, a detachable photographing module, and other auxiliary function modules, are increasingly widely applied to the smartphone. However, a communication function is still one of the most significant functions of the smartphone. Generally, these auxiliary function modules installed on the smartphone not only bring more functions, but also interfere with communication of the phone, decreasing communication quality of the phone.

In the prior art, the detachable module is usually located at the top of the phone and is mostly made of metallic materials. When the detachable module is added, a top antenna near the detachable module is blocked by the detachable module. Consequently, sensitivity of the top antenna decreases by 6 to 7 decibels, and the phone on which the detachable module is installed has poor communication quality in communication with the outside or even cannot communicate with the outside normally.

SUMMARY

Embodiments of the present invention provide a separated communications device to resolve a problem in the prior art that, when a detachable module is installed on a phone, a communication function of the phone deteriorates and the phone cannot communication with the outside.

A first aspect of the embodiments of the present invention provides a separated communications device, including:

a body and a movable connector; the body includes an antenna and a first conductive strip, and the antenna is electrically connected to the first conductive strip; the movable connector includes a second conductive strip; the second conductive strip is connected to the first conductive strip when the body is connected to the movable connector; and a connection position is set on the body, where when the movable connector is connected to the body, the connection position refers to a part, covered by the movable connector due to the connection, on a surface of the body, and the antenna is disposed on the body near the connection position.

With reference to the first aspect, in a first implementation manner of the first aspect of the present invention, another connection position corresponding to the connection position is set on the movable connector, where when the movable connector is connected to the body, the another connection position refers to a part, covered by the body due to the connection, on a surface of the movable connector.

With reference to the first aspect, in a second implementation manner of the first aspect of the present invention, at least one first electrical connection component is disposed on the antenna, and the first electrical connection component is fastened to the antenna; and a second electrical connection component whose quantity is equal to a quantity of first electrical connection components and that matches the first electrical connection component is disposed in a connection part, electrically connected to the antenna, on the first conductive strip.

With reference to the first aspect and the second implementation manner of the first aspect, in a third implementation manner of the first aspect of the present invention, a spring is disposed on the first electrical connection component; a contact terminal matching the spring is disposed on the second electrical connection component; and the antenna is movably connected to the first conductive strip by using the spring and the contact terminal.

With reference to the first aspect and the first implementation manner of the first aspect, in a fourth implementation manner of the first aspect of the present invention, a communications slot and stopper grooves are disposed in the connection position; a communications plug matching the communications slot and stopper protrusions matching the stopper grooves are disposed in the another connection position; the body is fixedly connected to the movable connector when the stopper grooves are engaged with the stopper protrusions; and the first conductive strip is connected to the second conductive strip when the communications slot is electrically connected to the communications plug.

With reference to the first aspect and the fourth implementation manner of the first aspect, in a fifth implementation manner of the first aspect of the present invention, the stopper protrusions are symmetrically disposed on two sides of the communications plug; and the stopper grooves are symmetrically disposed on two sides of the communications slot.

With reference to the first aspect and the first implementation manner of the first aspect, in a sixth implementation manner of the first aspect of the present invention, a communications slot and stopper grooves are disposed in the another connection position; a communications plug matching the communications slot and stopper protrusions matching the stopper grooves are disposed in the connection position; the body is fixedly connected to the movable connector when the stopper grooves are engaged with the stopper protrusions; and the first conductive strip is connected to the second conductive strip when the communications slot is electrically connected to the communications plug.

With reference to the sixth implementation manner of the first aspect, in a seventh implementation manner of the first aspect of the present invention, the stopper protrusions are symmetrically disposed on two sides of the communications plug; and the stopper grooves are symmetrically disposed on two sides of the communications slot.

It can be seen from the foregoing technical solution that, in the embodiments of the present invention, an antenna on a body near a connection position is electrically connected to a first conductive strip, so that the first conductive strip serves as a part of the antenna and signal strength of the antenna is enhanced. In addition, when the body is connected to a movable connector, a second conductive strip on the movable connector is electrically connected to the first conductive strip, so that the second conductive strip further serves as an extended part of the antenna. Therefore, signal strength of the extended antenna is further significantly enhanced, communication quality in communication between a communications terminal and the outside is effectively improved, and a problem in the prior art that, when a detachable module is installed on a phone, a communication function of the phone deteriorates and the phone cannot communication with the outside is resolved.

Figure 1:
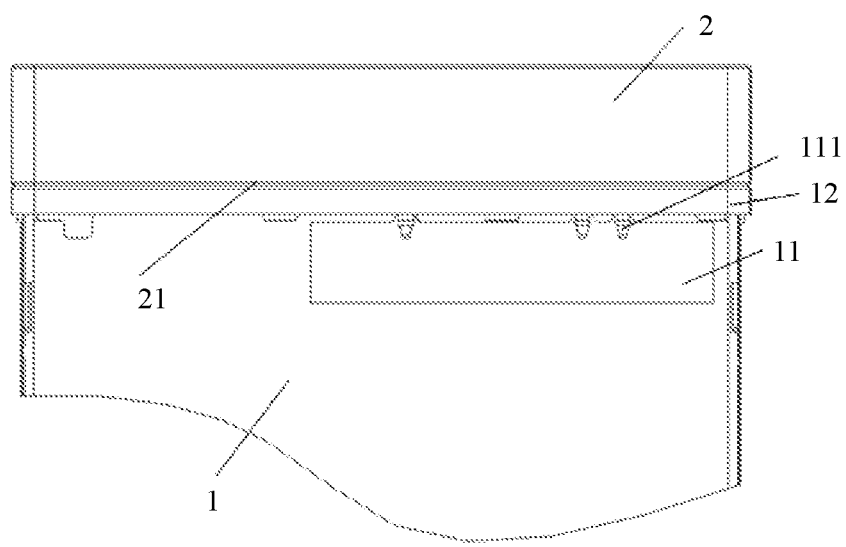
FIG. 1 is a schematic top view of a separated communications device according to an embodiment of the present invention.
Figure 2:
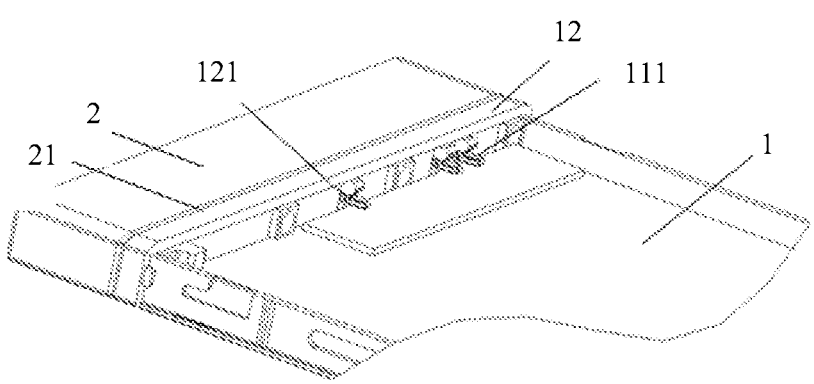
FIG. 2 is a schematic structural diagram of a side cross-section of a separated communications device according to an embodiment of the present invention.
Figure 3:
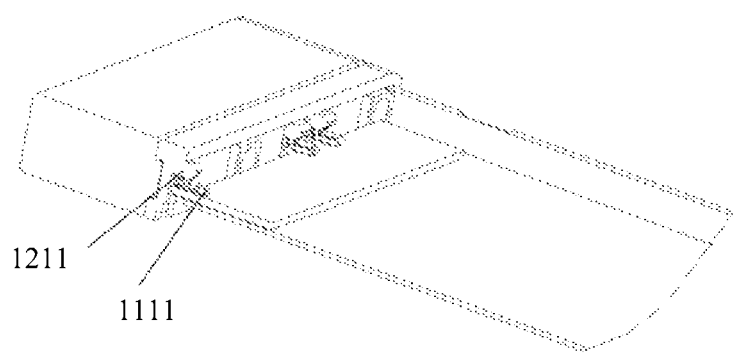
FIG. 3 is a schematic structural diagram of a side cross-section of a separated communications device according to an embodiment of the present invention.
Figure 4:
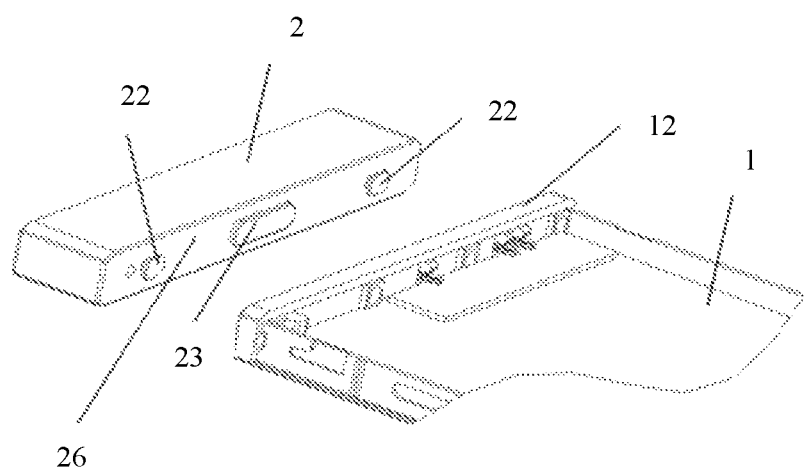
FIG. 4 is a schematic structural diagram of a side cross-section of a separated communications device according to an embodiment of the present invention.

In all the accompanying drawings, reference numerals are represented as follows:

1. Body; 2. Movable connector; 11. Antenna; 12. First conductive strip; 21. Second conductive strip; 13. Stopper groove; 14. Communications slot; 22. Stopper protrusion; 23. Communications plug;

24. Stopper groove; 25. Communications slot; 26. Another connection position; 15. Stopper protrusion; 16. Communications plug; 17. Connection position; 111. First electrical connection component; 121. Second electrical connection component; 1111. Spring; 1211. Contact terminal.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

In the specification, claims, and accompanying drawings of the present invention, the terms "first", "second", "third", "fourth", and so on are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device.

It should be noted that, a movable connector 2 in this specification is a detachable function module, which can specifically be another extended function module such as a camera or a secondary battery. This is not limited in this specification. In addition, materials and shapes of a first conductive strip 12 and a second conductive strip 12 in this specification are not limitedly described. The material may be any one of a conductor material, a semi-conductor material, or a superconductor material, or may be a conductor material obtained by combining at least any two of the three. A specific combination ratio or density or the like is not limitedly described, provided that a conductive function works. For example, the first conductive strip 11 may be a closed or half closed metal frame, and the second conductive body 12 may be a closed or half closed metal frame. This is not limited in this specification.

Figure 5:
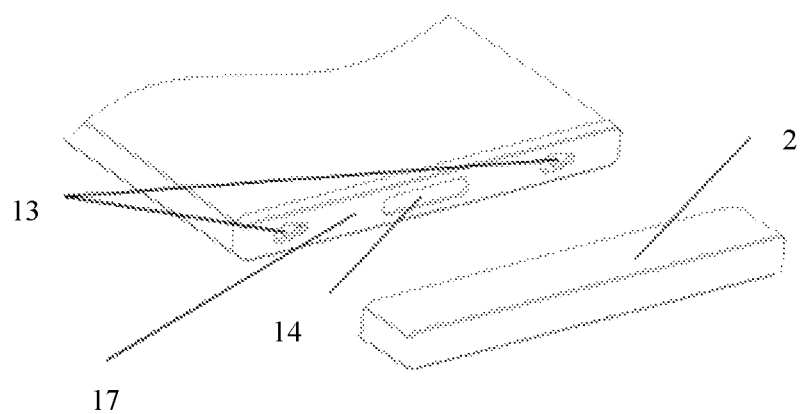
FIG. 5 is a schematic structural diagram of a side cross-section of a separated communications device according to an embodiment of the present invention.
Figure 6:
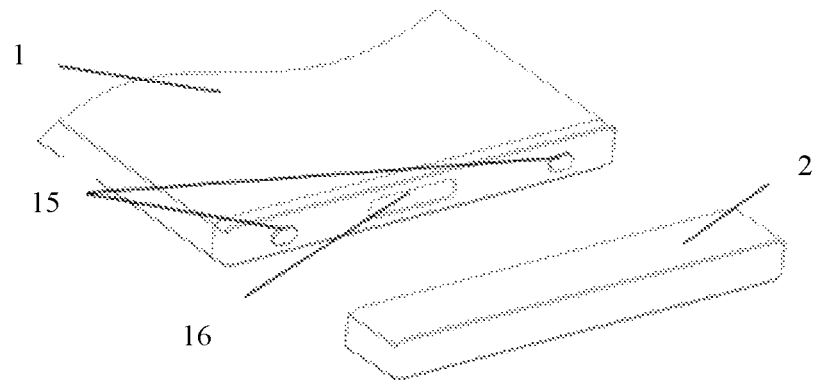
FIG. 6 is a schematic structural diagram of a side cross-section of a separated communications device according to an embodiment of the present invention.
Figure 7:
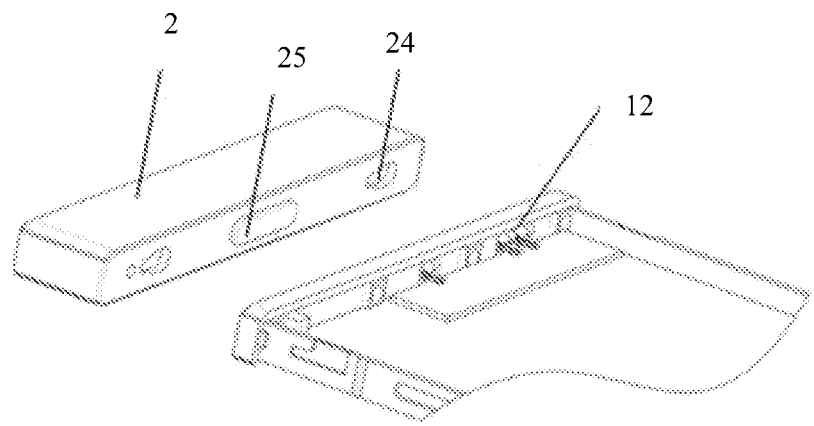
FIG. 7 is a schematic structural diagram of a side cross-section of a separated communications device according to an embodiment of the present invention.
Figure 8:
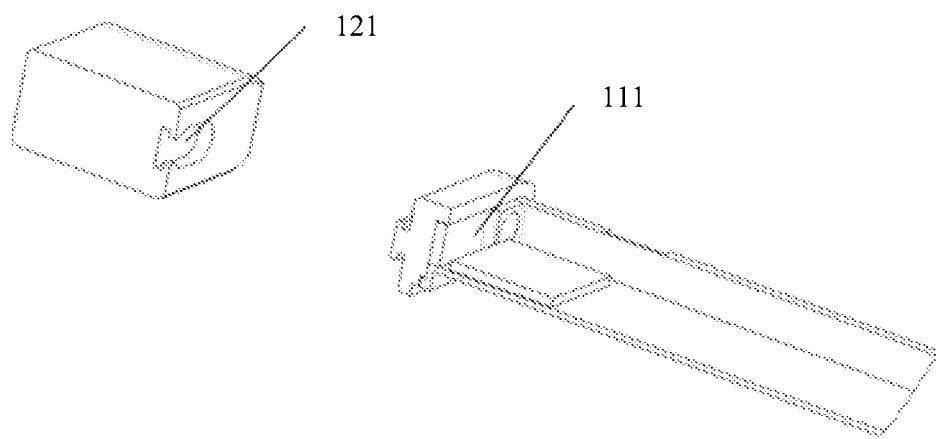
FIG. 8 is a schematic structural diagram of cross sections of a first connection component and a second electrical connection component in a separated communications device according to an embodiment of the present invention.

Referring to FIG. 1 and FIG. 5, an embodiment of a separated communications device according to an embodiment of the present invention includes:

a body 1 and a movable connector 2;

the body includes an antenna 11 and a first conductive strip 12, and the antenna 11 is electrically connected to the first conductive strip 12;

the movable connector 2 includes a second conductive strip 21;

the second conductive strip 21 is connected to the first conductive strip 12 when the body 1 is connected to the movable connector 2; and a connection position 17 is set on the body 1, where when the movable connector 2 is connected to the body 1, the connection position 17 refers to a part, covered by the movable connector 2 due to the connection, on a surface of the body 1, and the antenna 11 is disposed on the body 1 near the connection position 17.

In this embodiment of the present invention, an antenna 11 on a body 1 near a connection position 17 is electrically connected to a first conductive strip 12, so that the first conductive strip 12 serves as a part of the antenna 11 and signal strength of the antenna is enhanced. In addition, when the body 1 is connected to a movable connector 2, a second conductive strip 21 on the movable connector 2 is electrically connected to the first conductive strip 12, so that the second conductive strip 21 further serves as an extended part of the antenna 11. Therefore, signal strength of the extended antenna 11 is further significantly enhanced, communication quality in communication between a communications terminal and the outside is effectively improved, and a problem in the prior art that, when a detachable module is installed on a phone, a communication function of the phone deteriorates and the phone cannot communication with the outside is resolved.

Referring to FIG. 1 to FIG. 8, another embodiment of a separated communications device according to an embodiment of the present invention includes:

a body 1 and a movable connector 2;

the body includes an antenna 11 and a first conductive strip 12, and the antenna 11 is electrically connected to the first conductive strip 12;

the movable connector 2 includes a second conductive strip 21;

the second conductive strip 21 is connected to the first conductive strip 12 when the body 1 is connected to the movable connector 2; and a connection position 17 is set on the body 1, where when the movable connector 2 is connected to the body 1, the connection position 17 refers to a part, covered by the movable connector 2 due to the connection, on a surface of the body 1, and the antenna 11 is disposed on the body 1 near the connection position 17. Another connection position 26 corresponding to the connection position 17 is set on the movable connector 2.

Correspondingly, when the movable connector 2 is connected to the body 1, the another connection position 26 refers to a part, covered by the body 1 due to the connection, on a surface of the movable connector 2. It may be understood that the connection position 17 and the another connection position 26 are two opposite parts. Optionally, the connection position 17 or the another connection position 26 includes an insulation part and/or a conductive part.

For example, a shape of the body 1 is similar to a cuboid that includes two opposite long sides and two opposite short sides and has a particular thickness. One of the short sides is the connection position 17, and the antenna 11 is near the short side. Optionally, the first conductive strip 12 is also near the short side, or the first conductive strip 12 is disposed on the short side, or the short side is the first conductive strip 12. Optionally, a shape of the movable connector 2 is also similar to a cuboid that includes two opposite long sides and two opposite short sides and has a particular thickness. One of the short sides is the another connection position 26. When the foregoing body 1 is connected to the movable connector 2, the connection position 17 of the body 1 and the another connection position 26 of the movable connector 2 approach to each other and cover each other. In this case, the second conductive strip 21 is electrically connected to the first conductive strip 12, so that an electrical connection is established between the antenna 11 and the second conductive strip 21, and the second conductive strip 21 has a function of an antenna.

Optionally, the second conductive strip 21 covers most parts of or all of an external surface of the movable connector 2. A shape of the movable connector 2 may be alternatively set as an arc, a circle, a half-circle, or the like that has a particular thickness. A specific shape is not limited in this specification provided that the movable connector 2 is a detachable function module.

It should be noted that, that the second conductive strip 21 is electrically connected to the first conductive strip 12 means that, when the body 1 is connected to the movable connector 2, the second conductive strip 21 and the first conductive strip 12 are directly connected; because both the first conductive strip 12 and the second conductive strip 21 are conductive materials, when the second conductive strip 21 and the first conductive strip 12 are directly connected, a carrier can flow freely between the second conductive strip 21 and the first conductive strip 12 to produce a current.

It should be noted that, that the antenna 11 is electrically connected to the first conductive strip 12 means that the antenna 11 and the first conductive strip 12 may affect each other in a direct connection manner or an indirect coupling manner. In the indirect coupling manner, a gap may exist between the antenna 11 and the first conductive strip 12, and the antenna 11 may be coupled to the first conductive strip 12 by using the gap. Preferably, the direct connection manner is used for the antenna 11 and the first conductive strip 12.

Optionally, at least one first electrical connection component 111 is disposed on the antenna 11, and the first electrical connection component 111 is fastened to the antenna 11; and a second electrical connection component 121 whose quantity is equal to a quantity of first electrical connection components 111 and that matches the first electrical connection component 111 is disposed in a connection part, electrically connected to the antenna 11, on the first conductive strip 12.

Preferably, a spring 1111 is disposed on the first electrical connection component 111;

a contact terminal 1211 matching the spring 1111 is disposed on the second electrical connection component 121; and the antenna 11 is movably connected to the first conductive strip 12 by using the spring 1111 and the contact terminal 1211.

It should be noted that, a structure of the first electrical connection component 111 and a structure of the second electrical connection component 121 are not limited in this specification. This specification imposes no limitation provided that it can be implemented that the antenna 11 is electrically connected to the first conductive strip 12.

Optionally, a communications slot 14 and stopper grooves 13 are disposed in the connection position 17;

a communications plug 23 matching the communications slot 14 and stopper protrusions 22 matching the stopper grooves 13 are disposed in the another connection position 26;

the body 1 is fixedly connected to the movable connector 2 when the stopper grooves 13 are engaged with the stopper protrusions 22; and the first conductive strip 12 is connected to the second conductive strip 21 when the communications slot 14 is electrically connected to the communications plug 23.

Alternatively, a communications slot 14 and stopper grooves 13 are disposed in the another connection position 26;

a communications plug 23 matching the communications slot 14 and stopper protrusions 22 matching the stopper grooves 13 are disposed in the connection position 17;

the body 1 is fixedly connected to the movable connector 2 when the stopper grooves 13 are engaged with the stopper protrusions 22; and the first conductive strip 12 is connected to the second conductive strip 21 when the communications slot 14 is electrically connected to the communications plug 23.

The stopper protrusions 15 are symmetrically disposed on two sides of the communications plug 16; and stopper slots 24 are symmetrically disposed on two side of the communications slot 25.

In this embodiment of the present invention, an antenna 11 on a body 1 near a connection position 17 is electrically connected to a first conductive strip 12, a spring 1111 is disposed on a first electrical connection component 111 of the antenna 11, a contact terminal 1211 matching the spring 1111 is disposed on a second electrical connection component 121 on the first conductive strip 12, and the antenna 11 is electrically connected to the first conductive strip 12 by using the spring 1111 and the contact terminal 1211, so that the first conductive strip 12 serves as a part of the antenna 11 and signal strength of the antenna is enhanced. In addition, when the body 1 is connected to a movable connector 2, a second conductive strip 21 on the movable connector 2 is electrically connected to the first conductive strip 12, so that the second conductive strip 21 further serves as an extended part of the antenna 11. Therefore, signal strength of the extended antenna 11 is further significantly enhanced, communication quality in communication between a communications terminal and the outside is effectively improved, and a problem in the prior art that, when a detachable module is installed on a phone, a communication function of the phone deteriorates and the phone cannot communication with the outside is resolved.

Specific embodiments are used in this specification to describe the principle and implementation manners of the present invention. Descriptions of the foregoing embodiments are merely intended to help understand the method and core idea of the present invention. In addition, with respect to the implementation manners and the application scope, modifications may be made by persons of ordinary skill in the art according to the idea of the present invention. Therefore, the specification shall not be construed as a limitation on the present invention. The terms used in the embodiments of the present invention are merely for the purpose of illustrating specific embodiments, and are not intended to limit the present invention. The terms "a" and "the" of singular forms used in the embodiments and the appended claims of the present invention are also intended to include plural forms, unless otherwise specified in the context clearly. In should be further understood that, the term "a and/or b" used in this specification means any one of the following possible cases: only a exists, only b exists, and both a and b exist.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A separated communications device, wherein the communications device comprises:
   a body and a movable connector;
   the body comprises an antenna and a first conductive strip, and the antenna is electrically connected to the first conductive strip;
   the movable connector comprises a second conductive strip;
   the second conductive strip is connected to the first conductive strip when the body is connected to the movable connector; and
   a connection position is set on the body, wherein when the movable connector is connected to the body, the connection position refers to a part, covered by the movable connector due to the connection, on a surface of the body, and the antenna is disposed on the body near the connection position.

2. The separated communications device according to claim 1, wherein another connection position corresponding to the connection position is set on the movable connector; and when the movable connector is connected to the body, the another connection position refers to a part, covered by the body due to the connection, on a surface of the movable connector.

3. The separated communications device according to claim 2, wherein
   a communications slot and stopper grooves are disposed in the connection position;
   a communications plug matching the communications slot and stopper protrusions matching the stopper grooves are disposed in the another connection position;
   the body is fixedly connected to the movable connector when the stopper grooves are engaged with the stopper protrusions; and
   the first conductive strip is connected to the second conductive strip when the communications slot is electrically connected to the communications plug.

4. The separated communications device according to claim 3, wherein
   the stopper protrusions are symmetrically disposed on two sides of the communications plug; and
   the stopper grooves are symmetrically disposed on two sides of the communications slot.

5. The separated communications device according to claim 2, wherein
   a communications slot and stopper grooves are disposed in the another connection position;
   a communications plug matching the communications slot and stopper protrusions matching the stopper grooves are disposed in the connection position;
   the body is fixedly connected to the movable connector when the stopper grooves are engaged with the stopper protrusions; and
   the first conductive strip is connected to the second conductive strip when the communications slot is electrically connected to the communications plug.

6. The separated communications device according to claim 5, wherein
   the stopper protrusions are symmetrically disposed on two sides of the communications plug; and
   the stopper grooves are symmetrically disposed on two sides of the communications slot.

7. The separated communications device according to claim 1, wherein at least one first electrical connection component is disposed on the antenna, and the first electrical connection component is fastened to the antenna; and
   a second electrical connection component whose quantity is equal to a quantity of first electrical connection components and that matches the first electrical connection component is disposed in a connection part, electrically connected to the antenna, on the first conductive strip.

8. The separated communications device according to claim 7, wherein a spring is disposed on the first electrical connection component;
   a contact terminal matching the spring is disposed on the second electrical connection component; and
   the antenna is movably connected to the first conductive strip by using the spring and the contact terminal.

* * * * *